(12) United States Patent
Wince et al.

(10) Patent No.: US 11,748,818 B1
(45) Date of Patent: Sep. 5, 2023

(54) SYSTEM AND METHOD FOR HEALTHCARE REVENUE CYCLE MANAGEMENT

(71) Applicant: Myndshft Technologies, Inc., Dover, DE (US)

(72) Inventors: Tyler Wince, Mesa, AZ (US); Ronnie Wince, Mesa, AZ (US)

(73) Assignee: Myndshft Technologies, Inc., Mesa, AZ (US)

( * ) Notice: Subject to any disclaimer, the term of this patent is extended or adjusted under 35 U.S.C. 154(b) by 765 days.

(21) Appl. No.: 16/564,545

(22) Filed: Sep. 9, 2019

Related U.S. Application Data

(60) Provisional application No. 62/732,897, filed on Sep. 18, 2018.

(51) Int. Cl.
  *G06Q 40/08* (2012.01)
  *H04L 9/08* (2006.01)

(52) U.S. Cl.
  CPC .......... *G06Q 40/08* (2013.01); *H04L 9/0838* (2013.01)

(58) Field of Classification Search
  CPC .............................. G06Q 40/08; H04L 9/0838
  USPC ............................................................ 705/2
  See application file for complete search history.

(56) References Cited

U.S. PATENT DOCUMENTS

| | | | | |
|---|---|---|---|---|
| 2018/0001184 A1* | 1/2018 | Tran | .................... | G09B 19/0038 |
| 2018/0060496 A1* | 3/2018 | Bulleit | .................. | H04L 9/0643 |
| 2019/0081789 A1* | 3/2019 | Madisetti | .............. | H04L 9/0637 |
| 2019/0197532 A1* | 6/2019 | Jayachandran | ....... | H04L 9/0618 |
| 2019/0238316 A1* | 8/2019 | Padmanabhan | ........ | G06N 20/00 |

(Continued)

FOREIGN PATENT DOCUMENTS

WO  WO2001004821 A1 * 1/2001 ............. G06F 17/60

OTHER PUBLICATIONS

Propensity to pay tools help focus revenue cycle resources. InstaMed. (Jun. 21, 2016). Retrieved Mar. 23, 2022, from https://www.instamed.com/news-and-events/article-propensity-to-pay-tools-help-focus-revenue-cycle-resources/ (Year: 2016).*

(Continued)

*Primary Examiner* — Shahid Merchant
*Assistant Examiner* — Winston Furtado
(74) *Attorney, Agent, or Firm* — BOOTH UDALL FULLER, PLC

(57) ABSTRACT

A method for healthcare revenue cycle management is disclosed, and includes receiving a transaction proposal at a first peer within a permissioned blockchain network (PBN). The transaction proposal includes a patient identity and a query, the query being a determination of unknown value to be made by a second organization of a plurality of organizations. Each organization of the plurality represents, within the PBN, one of a healthcare payer and a healthcare provider. The method also includes identifying a smart contract associated with the query and defined to automatically adjudicate the query. The method also includes invoking the smart contract in at least one endorsing peer, and receiving, from each endorsing peer, a proposed transaction response. The method further includes automatically adjudicating the query by executing chaincode on a second peer, operating on the required information to assign a value to the determination, then updating the immutable ledger.

18 Claims, 6 Drawing Sheets

(56) References Cited

U.S. PATENT DOCUMENTS

2019/0384627 A1* 12/2019 De Caro .............. G06Q 20/223

OTHER PUBLICATIONS

Engelhardt, M. A. (2017). Hitching healthcare to the chain: An introduction to blockchain technology in the healthcare sector. Technology Innovation Management Review, 7(10). (Year: 2017).*
Propensitytopaytoolshelpfocusrevenuecycleresources.InstaMed. (Jun. 21, 2016).RetrievedMar. 23, 2022,fromhttps://www.instamed.com/news-and-events/article-propensity-to-pay-tools-help-focus-revenue-cycle-resources/ (Year: 2016) (Year: 2016).*
Engelhardt,M.A.(2017).Hitchinghealthcaretothechain:Anintroductiontoblockchaintechnologyinthehealthcaresector. TechnologyInnovationManagementReview,7(10). (Year: 2017) (Year: 2017).*

* cited by examiner

SYSTEM AND METHOD FOR HEALTHCARE REVENUE CYCLE MANAGEMENT

RELATED APPLICATIONS

This application claims the benefit of U.S. provisional patent application 62/732,897, filed Sep. 18, 2018 titled "Healthcare Revenue Cycle Management System and Method," the entirety of the disclosure of which is hereby incorporated by this reference.

TECHNICAL FIELD

Aspects of this document relate generally to management of the healthcare revenue cycle.

BACKGROUND

It is difficult to overstate the complexity of modern healthcare systems, which rely on the cooperation of many different parties, such as healthcare providers like doctors, clinics, hospitals, pharmacies, and laboratories, healthcare payers like insurance and others, and other interested parties such as regulatory agencies and the like. Advancements in medical and other technologies have enabled these parties to each improve the health of a patient in their own particular way. However, the administrative framework behind these medical marvels, hereinafter referred to as the healthcare revenue cycle, is built upon a fragmented network of entities that do not always trust each other and sometimes have divergent business interests.

These parties each have their own internal systems for tracking their part of the cycle, ensuring compliance with the law, and furthering their own business interest. While all these entities are working together for the health and treatment of a patient, they are also each motivated by their own profit, sometimes to the detriment of the others. For example, an insurer would maximize revenue by only approving the minimal effective treatment, while a healthcare provider would want to provide the most effective treatment (and pay for the expensive equipment that treatment requires), possibly with diminishing returns.

Additionally, the interactions between these different parties is complicated by a lack of trust. Decisions that need to be made by one party often require information held by another, and the channels for requesting and providing such information can be frustratingly slow and unreliable. For example, prior authorization obtained through calling into a call center run by a payer may result in an approval that is later disputed by the payer, with only the unrecorded verbal interaction to rely on. In other cases, the payer may provide a web portal for asking if a patient has valid coverage; these portals often do not keep a record of how often that information is requested, or who is requesting it. The process of determining what information is needed, requesting that information from another party, waiting for the information, receiving and evaluating it to finally render a decision often makes the process slow to a crawl, and provides many opportunities for problems and disagreements to arise.

Within these fragmented systems, information sharing is limited. Parties are extremely reluctant to provide access to their internal systems, instead providing the bare minimum through often inefficient channels. Additionally, parties operating in different portions of the revenue cycle have developed application-specific computer system at great expense, over a long time. Even if all parties trusted each other and was open to the free exchange of information, the legacy systems in use are often incompatible with each other, and full integration would require a great deal of effort. As a consequence, nobody has the whole picture, and often are unaware of ongoing waste, fraud, doctor shopping, over-prescription, and abuse of services, to the detriment of the parties and the patient.

SUMMARY

According to one aspect, a method for healthcare revenue cycle management includes receiving, from a client device, a transaction proposal at a first peer of a plurality of peers certified by a first organization within a permissioned blockchain network (PBN). The PBN includes a plurality of organizations sharing an immutable ledger. The transaction proposal includes a patient identity and a query, the query being a determination of one of an out-of-pocket expense and a prior authorization. The determination is made by a second organization. The first organization represents a healthcare provider within the PBN. The second organization represents a healthcare payer within the PBN. The method also includes identifying, by the first peer, a smart contract associated with the query. The smart contract has an endorsement policy and a chaincode defined by the second organization to automatically adjudicate the query. The endorsement policy indicates the second organization and at least one organization responsible for information required by the second organization to execute the chaincode. Additionally, the method includes endorsing the transaction proposal using a private cryptographic key provided by the first organization. The method also includes invoking the smart contract in at least one endorsing peer using the endorsed transaction proposal. Each of the at least one endorsing peer is certified by a different organization of the at least one organization responsible for required information as indicated by the endorsement policy. The method for healthcare revenue cycle management includes receiving, from each of the at least one endorsing peers, an endorsed proposed transaction response as a result of the smart contract invocation. The method also includes automatically adjudicating the query by executing the chaincode on a second peer, operating on the required information to assign a value to the determination. The second peer is certified by the second organization, and the execution of the chaincode at the second peer is done in response to receipt of the endorsed proposed transaction response from each of the at least one endorsing peer. Additionally, the method includes updating the immutable ledger with the determination after validating the satisfaction of the endorsement policy, as well as sending to the client device the determination. Invoking the smart contract on the at least one endorsing peer results in a first endorsing peer requesting a data object from a legacy EMR/EHR system through a data aggregator, and transforming the data object provided by the legacy EMR/EHR system into a format compatible with the PBN. At least the first peer, the second peer, and the at least one endorsing peer are all hosted within a shared hardware environment.

Particular embodiments may comprise one or more of the following features. The method may further include retrieving historical transaction data from the immutable ledger of the PBN. Said historical transaction data may comprise billing transactions, payment transactions, and/or treatment transactions. The method may also include training a propensity-to-pay machine learning model using the historical transaction data. The determination produced by the execution of the chaincode indicates one of affirmative, negative, and that the query has been escalated for evaluation by a human agent of the healthcare payer. The method may also comprise identifying an unwelcome action within the immutable ledger by comparing a global state of the immutable ledger with historical transaction data from the immutable ledger. The unwelcome action may include one of insurance fraud, doctor shopping, and over-prescription of a pharmaceutical. Invoking the smart contract on the at least one endorsing peer may include a first endorsing peer executing a second smart contract installed on the first endorsing peer to generate a proposed transaction response to the invocation of the smart contract. The required information provided in the at least one endorsed proposed transaction response may come from at least one of reading a global state of the immutable ledger and updating the global state. The source of the required information in the at least one endorsed proposed transaction response may be determined by a comparison of an age of the information within the immutable ledger and an update policy defined by the second organization within the smart contract.

According to another aspect of the disclosure, a method for healthcare revenue cycle management includes receiving, from a client device, a transaction proposal at a first peer of a plurality of peers certified by a first organization within a permissioned blockchain network (PBN). The PBN includes a plurality of organizations sharing an immutable ledger. The transaction proposal includes a patient identity and a query, the query being a determination of unknown value to be made by a second organization of the plurality of organizations. Each organization of the plurality of organizations represents, within the PBN, one of a healthcare payer and a healthcare provider. The method also includes identifying, by the first peer, a smart contract associated with the query, the smart contract having an endorsement policy and a chaincode defined by the second organization to automatically adjudicate the query. The endorsement policy indicates the second organization and at least one organization responsible for information required by the second organization to execute the chaincode. The method further includes invoking the smart contract in at least one endorsing peer using the transaction proposal. Each of the at least one endorsing peer is certified by a different organization of the at least one organization responsible for required information as indicated by the endorsement policy. The method for healthcare revenue cycle management includes receiving, from each of the at least one endorsing peer, a proposed transaction response as a result of the smart contract invocation. The method also includes automatically adjudicating the query by executing the chaincode on a second peer, operating on the required information to assign a value to the determination. The second peer is certified by the second organization, and the execution of the chaincode at the second peer is done in response to receipt of the proposed transaction response from each of the at least one endorsing peer. The method also includes updating the immutable ledger with the determination after validating the satisfaction of the endorsement policy, and sending to the client device the determination.

Particular embodiments may comprise one or more of the following features. The query may be one of determining an out-of-pocket expense, and a prior authorization. Invoking the smart contract on the at least one endorsing peer may result in a first endorsing peer retrieving a data object from a third-party server that is outside of the PBN using a data aggregator to transform the data object into a format compatible with the PBN. The data aggregator may be communicatively coupled to the first endorsing peer and the third-party server and the third-party server may not be represented by any of the plurality of organizations. Invoking the smart contract on the at least one endorsing peer may result in a first endorsing peer requesting a data object from a legacy EMR/EHR system through a data aggregator, and/or transforming the data object provided by the legacy EMR/EHR system into a format compatible with the PBN. The determination produced by the execution of the chaincode may indicate one of affirmative, negative, and that the query has been escalated for evaluation by a human agent. The at least one endorsing peer may be certified by the first organization. At least the first peer, the second peer, and/or the at least one endorsing peer may all be hosted within a shared hardware environment. At least the first peer, the second peer, and/or the at least one endorsing peer may be each implemented as containers within the shared hardware environment. The method may further include retrieving historical transaction data from the immutable ledger of the PBN, and/or training a machine learning model using the historical transaction data. The historical transaction data may include billing transactions, payment transactions, and/or treatment transactions. The machine learning model may be a propensity-to-pay model. The smart contract may be a first smart contract, and invoking the first smart contract on the at least one endorsing peer may comprise a first endorsing peer executing a second smart contract installed on the first endorsing peer to generate the proposed transaction response to the invocation of the first smart contract. The required information provided in the at least one endorsed proposed transaction response may come from at least one of reading a global state of the immutable ledger and updating the global state. The source of the required information in the at least one endorsed proposed transaction response may be determined by a comparison of an age of the information within the immutable ledger and an update policy defined by the second organization within the smart contract.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
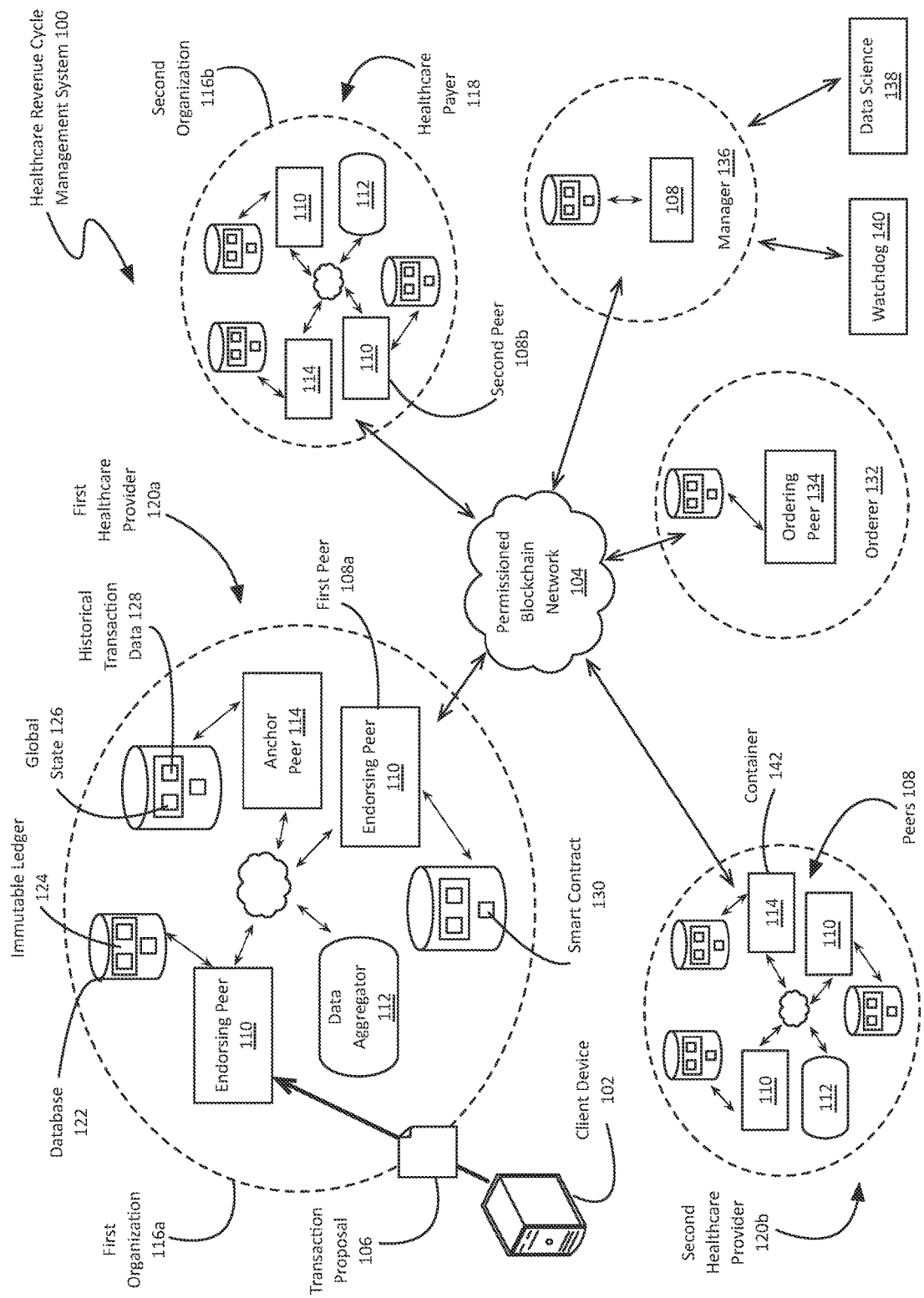
FIG. 1 is a schematic view of a healthcare revenue cycle management system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

It is difficult to overstate the complexity of modern healthcare systems, which rely on the cooperation of many different parties, such as healthcare providers like doctors, clinics, hospitals, pharmacies, and laboratories, healthcare payers like insurance and others, and other interested parties such as regulatory agencies and the like. Advancements in medical and other technologies have enabled these parties to each improve the health of a patient in their own particular way. However, the administrative framework behind these medical marvels, hereinafter referred to as the healthcare revenue cycle, is built upon a fragmented network of organizations that do not always trust each other and sometimes have divergent business interests.

In the context of the present disclosure, the healthcare revenue cycle comprises events and activities ranging from the onboarding of a patient for services to billing out a claim to a payer, and all of the administrative steps in between. These administrative tasks may include, but are not limited to, validating insurance eligibility, calculating the out-of-pocket cost for patient to get a specific set of services, and obtaining prior authorizations for services a patient is going to receive.

These parties each have their own internal systems for tracking their part of the process, ensuring compliance with the law, and furthering their own interest. While all these entities are working together for the health and treatment of a patient, they are also each motivated by their own profit, sometimes to the detriment of the others. For example, an insurer would maximize revenue by only approving the minimal effective treatment, while a healthcare provider would want to provide the most effective treatment (and pay for the expensive equipment that treatment requires), possibly with diminishing returns.

Additionally, the interactions between these different parties is complicated by the divergent business interests, as well as a lack of trust. Decisions that need to be made by one party often require information held by another, and the channels for requesting and providing such information can be frustratingly slow and unreliable. For example, prior authorization obtained through calling into a call center run by a payer may result in an approval that is later disputed by the payer, with only the unrecorded verbal interaction to rely on. In other cases, the payer may provide a web portal for asking if a patient has valid coverage; these portals often do not keep a record of how often that information is requested, or who is requesting it. The process of determining what information is needed, requesting that information from another party, waiting for the information, receiving and evaluating it to finally render a decision often makes the process slow to a crawl, and provides many opportunities for problems and disagreements to arise.

Within these fragmented systems, information sharing is limited. Parties are extremely reluctant to provide access to their internal systems, instead providing the bare minimum through inefficient channels. Additionally, parties operating in different portions of the revenue cycle have developed application-specific computer system at great expense, over a long time. Even if all parties trusted each other and was open to the free exchange of information, the legacy systems in use are often incompatible with each other, and full integration would require a great deal of effort. As a consequence, none of the parties has the whole picture, and as a result, waste, fraud, doctor shopping, over-prescription, and abuse of services can go undetected, to the detriment of the parties and the patient.

Contemplated herein is a system and method for healthcare revenue cycle management that is built upon, and automated through, a permissioned blockchain network. The various parties involved in the revenue cycle are represented within this network as organizations, all sharing a ledger that provides an immutable record of transactions, and a global state holding shared information that can be trusted, even if there is no trust between the parties themselves. Much of the inter-organizational interactions and intra-organizational operations are automated through the use of smart contracts, greatly speeding up processes that have traditionally been very slow. Given the high stakes often involved in healthcare, those delays can be, at best, frustrating, and at worst, life threatening.

Additionally, by maintaining the immutable ledger, parties are able to see a timeline of transactions, rather than simply having information regarding the current state as is often the case in conventional systems. This additional information facilitates the detection of patterns and reduction of waste and fraud that tends to slip through the cracks in conventional management systems and networks. The ledger may also provide material to quickly build artificial intelligence and machine learning models.

For example, the chronology of a patient's interaction with the healthcare revenue cycle management system may be used to build a propensity-to-pay model, which could be used to predict the likelihood a patient will pay for a service based upon prior services, payment history, geographic location, medical conditions, and the like. Typical systems only track a current status, such as if a bill is overdue or is paid. The immutable ledger will track when bills are paid, the services provided in the interim, and all the events leading up to the current status, which is also tracked as a global state. The immutable ledger also keeps the parties honest, preventing disputes that occur in conventional systems where information is shared and decisions rendered with little to no record keeping.

FIG. 1 shows a schematic view of a non-limiting example of a healthcare revenue cycle management system 100 (hereinafter HRCM system 100). The system 100 is built upon a permissioned blockchain network 104 through which a plurality of entities involved in healthcare, or having an interest in healthcare, can interact with speed and trust. Each of these entities or parties is represented within the blockchain network 104 by an organization 116.

An organization 116 may range in size and complexity from a small doctor's office to a national health insurance provider. Some organizations represent healthcare providers 120, meaning a party that is providing some sort of good or service. Examples include, but are not limited to, hospitals, doctor offices, clinics, laboratories, imaging facilities, pharmacies, treatment centers, and the like. Other organizations may represent healthcare payers 118, meaning a party that pays on behalf of a patient for some good or service. Examples include, but are not limited to, insurance companies, Medicaid, pharmaceutical rebate programs, and the like. In some embodiments, an HRCM system 100 may comprise organizations representing multiple healthcare providers 120 and multiple healthcare payers 118.

Additionally, according to various embodiments, the HRCM system 100 may also include special organizations, such as a manager organization 136 and an orderer organization 132. An orderer organization 132 comprises one or more ordering peers 134 and is responsible for verifying proposed transactions, ordering them into blocks, and disseminating updates to the immutable ledger throughout the blockchain network 104. According to various embodiments, a manager organization 136 may administer the blockchain network 104, bridge multiple networks, and/or provide additional functionality by operating on the immutable ledger 124 with systems such as a data science system 138 or a watchdog system 140, both of which will be discussed further, below. The orderer 132 will be discussed in greater detail with respect to FIG. 2. The manager organization 136 will be discussed in greater detail with respect to FIGS. 2 and 5.

As shown, each organization 116 comprises one or more peers 108. A peer 108 acts as a representative for the organization 116 within the permissioned blockchain network 104 (hereinafter BCN 104). These peers 108 are used to obtain and share information with other organizations 116 within the BCN 104. According to various embodiments, a peer 108 may be implemented as a discrete unit of computer hardware, such as a server, or may be implemented in an abstracted or even distributed environment, such as a virtual machine, a container, a pod within a cluster, and the like. Specialized types of peers 108 will be discussed below.

As mentioned above, the organizations 116 interact with each other through a permissioned blockchain network (PBN) 104. A permissioned blockchain network 104 is a technical infrastructure that provides immutable ledger and smart contract services. Transactions and access is limited to peers having proper permissions. In some embodiments, membership services are managed by one or more certificate authorities associated with each organization that issue public/private key cryptographic certificates to certify their peers, and that the peers use to endorse network messages (e.g. proposed transactions, proposed transaction responses, etc.). The use of a permissioned network prevents unauthorized access, rogue organizations, or violations of policies agreed upon by member organizations.

In some embodiments, organizations 116 will have more than one peer 108, which may provide redundancy in case of failure, and may be used to further partition certain types of information. As shown in FIG. 1, each peer 108 is connected to a database 122 within the organization. In some embodiments, one peer 108 may share a database 122 with another peer 108, but typically each peer 108 has its own database 122. Said database 122 may be implemented on the same hardware as the peer 108, or may be a separate hardware object that the peer 108 is coupled to, either directly or through a larger network.

The databases 122 are used to store one or more immutable ledgers 124, which comprises a global state 126 and a historical transaction data 128. In the context of the present description, a global state 126 is the current snapshot of the known "universe" within a particular PBN 104. It is the latest update for all the information available within the network 104, or that has been shared through the network 104. It does not contain historical data. For example, the global state 126 may indicate that patient Tyler Wince, with gold level insurance through Yellow Moon insurance, has no outstanding copays with his doctor's office. In some embodiments, the global state 126 may exist with a database structure.

The historical transaction data 128 is the transactional log of all operations within the blockchain network 104, as is known in the art. Each database 122 may maintain a copy of the historical transaction data 128, which tracks transactions, their results, and when they happened, across the network. Continuing with the example above, while the global state 126 may show that Tyler Wince is all paid up, the historical transaction data 128 may show that 5 weeks ago he owed a $25 copay after a doctor visit, and did not pay it until 3 days ago. According to various embodiments, the historical transaction data 128 may contain any information that has been shared between organizations 116, or requests that were made (even if they were not taken to completion). The global state 126 can be recreated using the information contained in the historical transaction data 128. Peers 108 within an organization 116 can share data to reconstitute a ledger, or the ledger may be requested from the orderer organization 132. The orderer 132 will be discussed in greater detail with respect to FIG. 2. According to various embodiments, the historical transaction data 128 may be stored as a flat file, in contrast to the database structure of the global state 126.

Furthermore, the blockchain ledger 124 is immutable, as is known in the art (e.g. chained hashing within blocks to prevent tampering, etc.). The use of an immutable shared ledger 124 to record the information transactions between the organizations 116 allows entities that might not have much trust in each other to move forward with confidence in the ledger 124, knowing that the other organizations 116 can be held to the things they "said" over the blockchain network 104.

The database 122 may also contain one or more smart contracts 130, which will be discussed in greater detail with respect to FIG. 2. In other embodiments, the smart contracts 130 may be localized in the endorsing peers 110, discussed below. Furthermore, the operation of the HRCM system 100 with respect to the ledger 124 and the blockchain network 104 will be discussed in greater detail with respect to FIG. 2. In some embodiments, databases 122 may have multiple ledgers 124, when the coupled peer 108 is participating in more than one channel 300. Channels 300 will be discussed in greater detail below with respect to FIG. 3.

According to various embodiments, an organization 116 may be associated with, or make use of, more than one kind of peer 108. As shown in FIG. 1, an organization 116 may have an anchor peer 114. An anchor peer 114 is the first point of contact with the rest of the network 104 when a ledger update is sent out from the orderer 132. The anchor peer 114 receives these updates and disseminates them to the other peers 108 within the organization 116.

Each organization 116 includes at least one endorsing peer 110. In the context of the present description, an endorsing peer 110 is a peer 108 that hosts or has access to at least one smart contract 130, and is capable of endorsing proposed transactions 106 (e.g. using a cryptographic certificate issued by the parent organization 116). Proposed transactions 106 and smart contracts 130 will be discussed in greater detail with respect to FIG. 2, below. In some embodiments, all peers 108 within an organization 116 may be endorsing peers 110, while in others some of the peers 108 may be reserved to perform validation or maintain ledger status. As an option, a peer 108 may temporarily be given or lose "endorsing peer" status, depending on requirements of the HRCM system 100 (e.g. reconstituting ledgers 124 after data loss, etc.).

In operation, an endorsing peer 110 is able to provide a simple yes or no on a proposed transaction 106 (e.g. an information request, etc.). If the peer 108 is able to fulfill the smart contract 130 related to the proposed transaction 106, it "signs" the transaction and passes it to the orderer 132, as will be discussed in greater detail with respect to FIG. 2. In some embodiments, the signature of an endorsing peer 110 may be accomplished using a digital certificate.

It should be noted that the endorsement of a proposed transaction 106 by a peer 108 does not indicate an adjudication or result, simply that the requested aspect of a smart contract 130 was able to be fulfilled. For example, a peer 108 belonging to a health insurance organization 118 may receive a proposed transaction 106 from a provider 120 regarding authorization for a medical procedure. The smart contract 130 that handles such proposed transactions 106 examines the ledger 124 and finds that all the needed information is available, but determines that the procedure is not authorized because it is not a medical necessity. The endorsing peer 110 handling this proposed transaction 106 would sign the result, indicating the smart contract 130 was able to fulfill its requirements to perform its job, and the signed result, "denied", is returned to the endorser 110.

According to various embodiments, the peers 108 do not get bogged down in the details of a transaction, but instead leave that to the smart contracts 130 which they execute and ensure have everything that is needed to do their job. If they can do their job, the peer 110 will sign the result. If they cannot do their job, the peer 110 will not sign the result, according to various embodiments. In some embodiments, each endorsing peer 110 in an organization 116 may store, or have access to, all smart contracts 130 that it may deal with (those executed by the organization 116 and possibly those from other organizations 116 that may request information). In other embodiments, the smart contracts 130 may be distributed among the peers 108 of an organization 116 in a manner that spreads the computational or network load evenly, or based upon other criteria.

As shown in FIG. 1, each organization 116 may also be associated with a data aggregator 112. In the context of the present description, a data aggregator 112 is a tool that allows for the collection, reformatting, and consolidation of data. The data aggregator 112 may stand as an interface between proprietary or legacy systems used by an organization 116 (e.g. internal records system, inventory system, accounting system, patient records system, electronic medical record/electronic health record (EMR/EHR) systems, etc.) and the peers 108 connected to the blockchain network 104. The data aggregator 112 allows an organization 116 to become part of the blockchain network 104 and participate in the HRCM system 100 quickly, and without requiring a complete overhaul of systems that may have been the result millions of dollars and years of effort. Each organization 116 may use different internal systems, and the data aggregator 112 provides a way to quickly place all of the shared data in a common format. The use of a consistent format facilitates automation of the system, as well as other features such as private peer-to-peer information sharing, which will be discussed in greater detail with respect to FIG. 4, below. In some embodiments, the data aggregator 112 may employ some form of automation, while other embodiments may make use of artificial intelligence, to recognize patterns, formats, and data types, as well as reduce faulty reads. Furthermore, in some embodiments, a data aggregator 112 may be used to bridge multiple blockchain networks 104, which will be discussed with respect to FIG. 5, below.

As shown in FIG. 1, the HRCM system 100 also comprises one or more client devices 102. In the context of the present description, a client device 102 is a device configured to use an interface through which individuals or systems may interact with the HRCM system 100. Exemplary interfaces include, but are not limited to, websites or a web interface, APIs, mobile and/or desktop applications, and the like. A client device 102 may be any of various computing platforms, such as mobile devices, desktop devices, and embedded systems. Client devices 102 may use a variety of interfaces, such as an application or website, or even a phone based system with voice recognition.

As will be discussed with respect to FIG. 2, a client device 102 may be the source of a transaction proposal 106. In some embodiments, a client device 102 may be affiliated with an organization 116 or the party the organization 116 represents within the PBN 104. For example, a desktop computer running an interface application used by staff at a hospital, configured to verify insurance benefits. In other embodiments, a client device 102 may be operated outside of an organization 116, but still be related to an organization 116 (i.e. it communicates with a peer 108 associated with an organization 116). For example, a website that allows patients to look up a summary of their benefits, or the cost of various prescriptions under their insurance.

FIG. 1 shows the organizations 116 connected to each other through a provisioned blockchain network 104. According to various embodiments, the HRCM system 100 is built upon a blockchain network 104 through which the various organizations 116 interact. While the majority of the discussion below will be in the context of blockchain networks, it should be understood that the blockchain network 104 may be implemented in various ways, depending upon other characteristics of the HRCM system 100 discussed above. For example, in an embodiment where each organization 116 hosts and maintains their own hardware functioning as peers 108, the blockchain network 104 may be implemented on a WAN, such as the Internet. In another embodiment, where organizations 116 interface their internal systems with the HRCM system 100 through data aggregators 112, and the data aggregators 112, peers 108, and other system elements are hosted by a managing party, the blockchain network 104 may be implemented through the internal network of a datacenter, or the internal messaging of a cluster or other distributed computing environment, or even within a single device. While the following discussion will focus on how the organizations 116 interact with each other and the blockchain network 104, those skilled in the art will recognize that the physical implementation of the HRCM systems 100 contemplated herein, and the methods they employ, may be adapted to a variety of hardware and network architectures.

Before proceeding, it is important to address the potential divergence between the function of the system 100, and its implementation. For example, as depicted in FIG. 1, the concept of organizations 116 is being used to partition peers 108, databases 122, smart contracts 130, and the like, between different entities. Such a partitioning is functional, but not necessarily physical. For instance, in some embodiments, the peers 108 and databases 122 for different organizations 116 may be maintained by a single entity. In some embodiments, the elements shown in FIG. 1 and discussed below may be implemented in a container 142 or virtual machine environment, and the elements for more than one organization 116 may be hosted on the same device, cluster, or datacenter (i.e. a shared hardware environment).

For example, in one embodiment, peers 108 belonging to multiple organizations 116 may be implemented as containers 142. As an option, these containers 142 may exist within the same shared hardware environment, such as the specific computing device 600 of FIG. 6.

In other embodiments, organizations 116 may maintain their own hardware as related to the system 100. In still other embodiments, a combination may be utilized, where organizations 116 may continue to host and manage an internal, possibly proprietary system (as done in conventional HRCM systems) that interfaces with the blockchain network 104 through elements (e.g. peers 108, data aggregators 112, etc.) dedicated to that organization 116 but hosted by another party, such as the manager organization 136. Such an implementation may be advantageous as it may make it easier for an organization 116 to join and participate in the network 104 and benefit from the systems contemplated herein.

Figure 2:
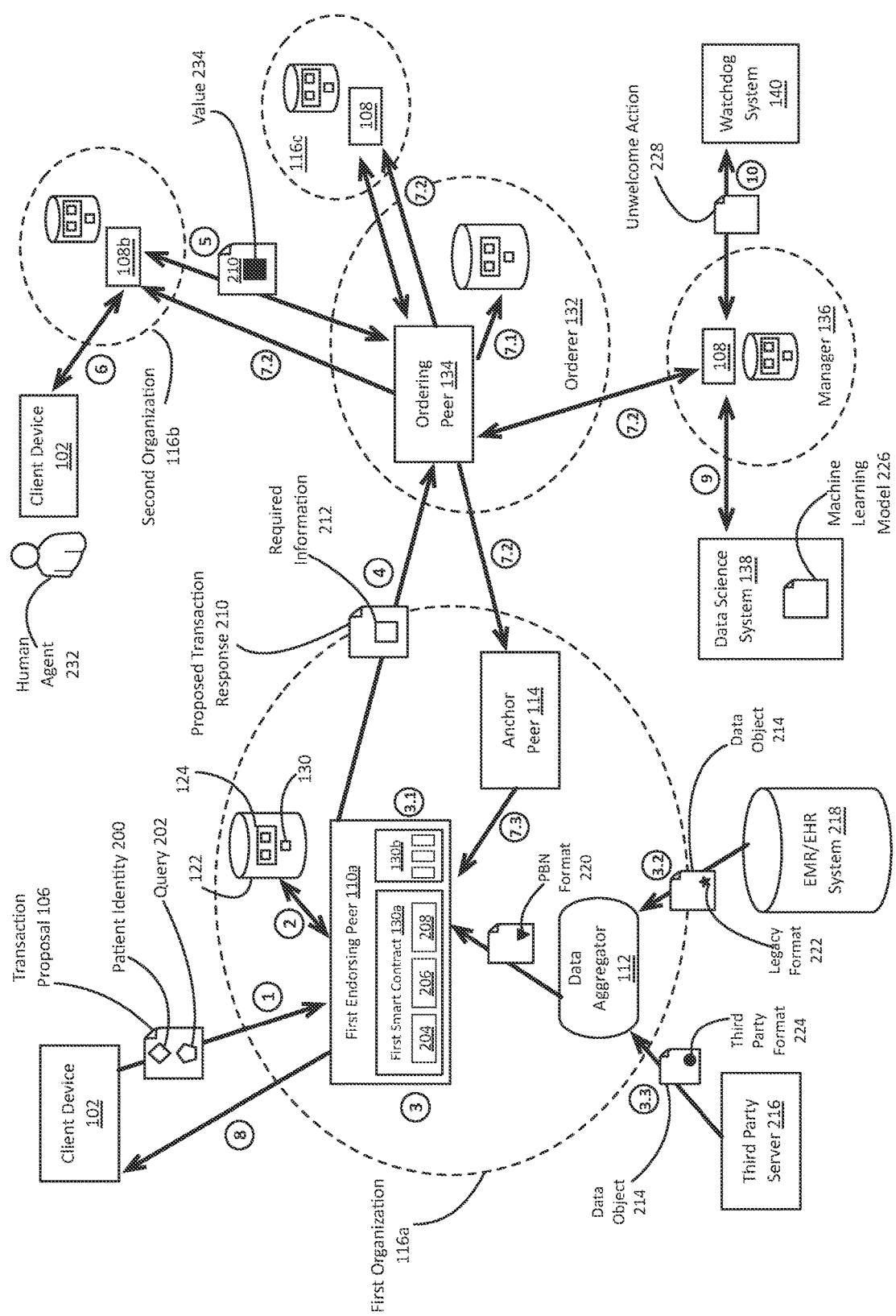
FIG. 2 is a schematic view of a transaction flow within a healthcare revenue cycle management method.

FIG. 2 is a schematic view of an exemplary transaction flow for a non-limiting example of a method for healthcare revenue cycle management within a HRCM system 100. Though not explicitly shown in FIG. 2, all of the transactions between organizations 116 are occurring through a permissioned blockchain network 104, and communications between peers 108 and other elements within an organization 116 and elements outside of an organization 116, such as a third-party server 216, occur through conventional networks and protocols, as is known in the art. However, it should be noted that these transactions non-limiting examples.

The process begins with the receipt of a transaction proposal 106 from a client device 102. See circle 1. A transaction proposal 106 is a formalized set of input parameters for a transaction within the HRCM system 100. Exemplary transactions include, but are not limited to, making some sort of request (e.g. requesting an adjudication from another organization 116, etc.), the submission of patient information during onboarding, the updating of information regarding patient status, or even simply reading information from the shared immutable ledger 124. As previously stated, the client device 102 interacts with a peer 108 from an organization 116 with which it is associated. For the example shown in FIG. 2, the client device 102 may be a computer used by a hospital to request prior authorization for a surgical procedure.

According to various embodiments, a transaction proposal 106 comprises, at the least, a patient identity 200 and a query 202, when the transaction or interaction with the system 100 is related to a particular individual. In other words, a transaction proposal 106 could be crafted to obtain information or perform an action that is not patient-specific and that would not necessarily contain a patient identity 200.

In the context of the present description and the claims that follow, a patient identity 200 is a piece of information that can be used to uniquely identify a particular individual, specific enough to facilitate access of additional information from other systems. Examples include, but are not limited to, social security numbers, patient record numbers within a EMR/EHR system, and the like. In some embodiments, a patient identity 200 may comprise more than one piece of information. For example, a patient identity 200 may include a full name, address, and birth date, or some other combination of data that, used together, can differentiate one person from another.

In some cases, the client device 102 may form the transaction proposal 106 with a patient identity 200 specifying a unique identifier that is particular to the organization 116 with which the client device 102 is associated (e.g. the first organization 116a of FIG. 2, etc.). For example, a client device 102 in a hospital might use that hospital's patient number as the patient identity 200, even though that patient number would be useless to other organizations 116 within the HRCM system 100. In such cases, the patient identity 200 may be used to pull a universally agreed upon set of identifying information from within the parent organization before continuing to transact with other organizations 116 concerning that patient. Such a situation may be dealt with through a thoughtfully crafted smart contract 130, as will be discussed in greater detail, below.

In the context of the present description and the claims that follow, a query 202 is a determination of unknown value to be made by an organization 116 within the PBN 104. The query 202 may be thought of as the question that is represented by a field (i.e. the determination) that is empty or valueless. The transaction proposal 106 is a set of input parameters, and the specification of a field that does not have a value can trigger the execution of a smart contract 130 that has been defined for the specific purpose of filling in that field. Exemplary queries 202 include, but are not limited to, determining an out-of-pocket expense a patient will have to bear for a particular medical procedure in light of their insurance coverage, and a request for prior authorization from a payer for a specified treatment a provider has ordered for the patient, and the like.

According to various embodiments, a transaction proposal 106 having a query 202 can be said to originate from a first organization 116a and seek a determination from a second organization 116b within a HRCM system 100 comprising a plurality of organizations 116 that include payers 118, providers 120, and other entities such as managers 136 and orderers 132, among others. It should be noted that such a transaction proposal 106 could ultimately require involvement (i.e. endorsement) from organizations 116 beyond the first organization 116a and second organization 116b, as will be discussed below. In some cases, the first and second organizations may both be payers 118 (e.g. a patient has primary and secondary health insurance and they are sorting out a bill, etc.). In other cases, the first and second organizations may both be providers 120a, 120b (e.g. hospital requesting a determination from a pharmacy whether a certain drug will interact with the patient's other medications, etc.). In still other cases, the first organization 116a may be a provider 120, and the second organization 116b may be a payer 118, or vice versa. The non-limiting example shown in FIG. 2 will be discussed in the context of a transaction proposal 106 received at a first peer 108a belonging to a first organization 116a that is a provider 120, seeking a determination from a second organization 116b that is a payer 120. However, it should be noted that may other permutations of organizations, as well as query types and sources, are possible.

In some embodiments, the client device 102 may prompt an individual for additional information if the client device 102 is aware of the particulars for the smart contract 130 that will be executed in response to this type of transaction proposal 106. In other embodiments, the transaction proposal 106 may be submitted from the client device 102 with minimal information, and if anything is missing, the client device 102 may be notified of the deficiency, or the missing information may be pulled from another source within the first organization 116a.

As shown, once the transaction proposal 106 has been formed by the client device 102, it is sent to a first peer 108a of the first organization 116a. In some embodiments, the first peer 108a may also be an endorsing peer 110, meaning it is able to sign the transaction proposal 106 on behalf of the first organization 116a.

Upon receipt of the transaction proposal 106, the first peer 108a (e.g. an endorsing peer 110) identifies a smart contract 130 associated with the query 202 specified in the proposal 106. See circle 2. In the context of the present description, a smart contract 130 comprises is a series of logic operations or steps that represent a procedure being executed on behalf of an organization 116. Smart contracts 130 identify what information is needed, where it needs to come from, what organizations 116 need to sign and/or how many peers 108 need to sign, the criteria for rendering a decision, and any other evaluation or function that may be involved in automating a particular procedure, evaluation, or transaction. In some embodiments, nothing is added to the ledger 124 without going through a smart contract 130 first.

In some embodiments, the appropriate smart contract 130 may be identified by matching the missing data in the transaction proposal 106 with an organization 116b in some way linked to the patient or patient identity 200. According to various embodiments, smart contracts 130 may be implemented as scripts, using languages such as Go or JavaScript, or the like. In some embodiments, smart contracts 130 may be defined along with a policy, or a defined set of requirements that can be passed along to other peers and organizations, such that they are aware of the required information 212, but are not privy to the logic being employed to render a result.

Smart contracts 130 are defined by their organizations 116. For example, the smart contract 130 for obtaining prior authorization from Yellow Moon insurance would be defined by Yellow Moon insurance, and would include all the steps they would take to make such a determination, including what information is needed, and how it should be validated. Peers 108 may also store copies of the smart contracts 130 of other organizations 116, or derivatives of those smart contracts 130, to know what information to pass along. For example, a doctor may have the smart contracts 130 for many different payer organizations 116.

According to various embodiments, a smart contract 130 may comprise a chaincode 206 that has been defined by the parent organization 116 (in FIG. 2, the second organization 116b) to automatically adjudicate the query 202 of the transaction proposal 106. The smart contract 130 also comprises an endorsement policy 204. In the context of the present description and the claims that follow, an endorsement policy 204 of a smart contract 130 indicates which organizations 116 need to "sign off" on the smart contract 130 before the proposed transaction 106 can be validated and the global state 126 of the ledger 124 updated. The endorsement policy 204 may indicate which organizations 116 need to sign, and may also indicate the number of signatures needed (e.g. the number of peers that need to apply their certificates, etc.). In some embodiments, the endorsement policy 204 of a smart contract 130 indicates all of the organizations responsible for information 212 required to execute the chaincode 206. For example, in one embodiment, the endorsement policy 204 may indicate, at the least, the parent organization (in FIG. 2, the second organization 116b) and at least one other organization 116, such as the first organization 116a, since the organization that received the transaction proposal 106 must endorse it before it may be submitted to a smart contract 130 and propagated to other organizations 116 in the PBN 104.

In some embodiments, the smart contract 130 may also specify an update policy 208, which defines an age threshold for when information will be accepted from the global state 126 and when updated information will be sought from an organization 116. The use of an update policy 208 will be discussed in greater detail, below.

Continuing with the non-limiting prior authorization example shown in FIG. 2, the endorsing peer 110 of the first provider 120a (i.e. first organization 116a) may have a copy of the smart contract 130 requirements for prior authorization for a payer 118 (i.e. second organization 116b), which might indicate that the desired procedure and required pharmaceuticals need to be identified, along with the diagnosis, lab results, attending physician, and the like.

Once the smart contract 130 associated with the query 202 has been identified, it is invoked in at least one endorsing peer 110 using the transaction proposal 106. See circle 3. According to various embodiments, the smart contract 130 is invoked on endorsing peers 110 belonging to the organizations 116 indicated by the endorsement policy 204 of the smart contract 130 (e.g. the list of organizations 116 responsible for required information 212).

In the context of the present description and the claims that follow, invoking a smart contract 130 means calling the chaincode 206 of the smart contract 130 by sending a transaction proposal 106 to an endorsing peer 110. The endorsing peer 110, in response, executes the chaincode 206, endorses a proposal response, and returns the endorsed proposal response.

In some embodiments, invoking a smart contract 130 on one endorsing peer 110 may trigger the invocation of another smart contract 130 in order to respond to the first. For example, as shown in FIG. 2, invoking a first smart contract 130a on a first endorsing peer 110a may comprise executing a second smart contract 130b installed on the first endorsing peer 110a to generate a proposed transaction response 210 to the invocation of the first smart contract 130a. See circle 3.1.

The chain execution of smart contracts 130 is advantageous in that gives each organization more control over how it plays its part in the healthcare revenue cycle. For example, a payer may have defined a smart contract 130 for when, in response to a proposed medication prescribed by a provider, an alternative medication is preferred by the payer, and the payer is seeking agreement from all interested providers (e.g. the hospital, the pharmacy, etc.). In other words, the payer has defined a first smart contract 130a that is seeking endorsement from two provider organizations, 120a and 120b. When the pharmacy organization 120b receives the proposed transaction that they payer sent to its own endorsing peer 110 to trigger execution of the first smart contract 130a, it invokes a second smart contract 130b, defined by the pharmacy to determine if a proposed medication has any adverse interactions with other medications the patient is currently taking, or if the patient is allergic to the proposed medication. The chain execution of smart contracts allowed the payer and the pharmacy to define how they carry out their roles within the healthcare revenue cycle, and the smart contracts worked together to allow the process to move forward at a speed and consistency otherwise not possible with conventional healthcare revenue cycle management systems and methods.

In some embodiments, one of the at least one endorsing peers 110 receiving the transaction proposal 106 may be certified by (e.g. issued a cryptographic certificate by, associated with, etc.) the first organization 116a (i.e. it is sent to the organization associated with the client device 102 that originally provided the transaction proposal 106). This is advantageous, as it reduces the amount of information a client device 102 is required to have access to in order to invoke the smart contract 130. For example, allowing the smart contract to request additional information from the first organization means that the client device 102 only need supply enough information that the endorsing peer 110 is able to identify the appropriate smart contract to invoke, and what that smart contract is looking into (e.g. patient, procedure, medication, policy, etc.). The first organization can then be queried to obtain any additional information that the first organization 116a is responsible for and that the second organization 116b needs to fully execute the chaincode 206 of the smart contract 130.

In some embodiments, a peer 108 may seek for information within systems that exist outside of the permissioned blockchain network 104. While peers 108 within the PBN 104 can be forced to communicate using a data format 220 that has been agreed upon by the organizations that make up the PBN 104, the same cannot be said for systems outside of the PBN 104. Accordingly, in some embodiments, organizations 116 may have one or more data aggregators 112 that may be used to interact with systems external to the PBN 104.

For example, in some embodiments, the HRCM system 100 may transact with legacy EMR/EHR systems 218, allowing an entity to provide unfettered access to their representative organization 116 within the PBN 104 without requiring the abandonment of systems, such as legacy EMR/EHR systems, that may have been built up over a long period of time and at great expense. As shown in FIG. 2, the invocation of a smart contract 130 on an endorsing peer 110 may result in that peer requesting a data object 214 from a legacy EMR/EHR system 218 through a data aggregator 112. The data object 214 may be provided by the legacy system 218 in a legacy format 222. The data aggregator 112 may receive that data object 214 in a legacy format 222, and transform it into a format 220 compatible with the PBN 104, according to various embodiments. See circle 3.2. According to various embodiments, the data aggregator 112 may be used to format and send a data object 214 from the HRCM system 100 to a legacy system 218, or otherwise interact with the legacy system 218.

As a more specific example of how this may be used, a diagnosis and attending physician notes for a particular patient may be stored on an internal hospital database that the peer queries through the data aggregator, obtaining data ultimately needed for a payer to render a decision regarding prior authorization for a surgical procedure.

In some embodiments, the peer 108 may seek information outside of the HRCM system 100 by interacting with a third-party via a data aggregator 112, as shown in circle 3.3. In some instances, required information 212 may be held on a third-party server 216. Examples include, but are not limited to, servers belonging to regulatory or oversight entities, manufacturers of pharmaceuticals or medical equipment, and other entities that are not represented by organizations within the PBN 104. These servers 216 may hold required information that does not exist on the blockchain network 104. As shown in FIG. 2, the invocation of a smart contract 130 on an endorsing peer 110 may result in that peer requesting a data object 214 from a third-party server 216 through a data aggregator 112. The data object 214 may be provided by the third-party server 216 in a third-party format 224. The data aggregator 112 may receive that data object 214 in the third-party format 224, and transform it into a format 220 compatible with the PBN 104, according to various embodiments. According to various embodiments, the data aggregator 112 may be used to format and send a data object 214 from the HRCM system 100 to a third-party server 216.

As mentioned previously, the immutable ledger 124 comprises a global state 126 from which the last known values for various "facts" known to the HRCM system 100 may be accessed. In some embodiments, that access may resemble retrieving information from a conventional database. The use of a global state 126 can enhance the performance of the system 100, allowing chaincode to act immediately without having to request every piece of required information 212 be pulled from the source organizations upon every execution. In other words, the required information 212 provided in an endorsed proposed transaction response can come from either reading the global state 126, or updating the global state 126. The responsible organization updates the global state 126 as a consequence of executing a smart contract that obtains the latest known value for that information from a source other than the ledger 124 (e.g. pulling it from a legacy EMR/EHR system 218 using a data aggregator 112, etc.).

In some embodiments, the decision of whether to obtain required information 212 from the ledger 124 or requesting fresh data from the responsible organization may be determined by an update policy 208 specified within the smart contract 130. According to various embodiments, an update policy 208 may provide a threshold age. If the value for the required information 212 found in the global state 126 is younger (i.e. it was placed on or updated on the ledger 124 sooner than the threshold age) than the threshold age, the information from the global state 126 may be used. Otherwise, the information is requested via a smart contract 130 defined to cause the global state 126 to be updated by the responsible organization 116. The use of an update policy 208 allows a smart contract 130 to enjoy the performance benefits of the global state 126 for information that is fresh, or that does not change (e.g. patient birthdate, etc.) while also making sure that required information 212 that is prone to change, such as lab results, is up-to-date.

In some cases, sensitive information needs to be shared, but should not be stored on the broadly available immutable ledger 124. In such instances, the transaction may be completed in one of two ways: using channels, to be discussed with respect to FIG. 3, and through a peer-to-peer transfer, to be discussed with respect to FIG. 4.

Once the endorsing peer 110 has determined that it has fulfilled its portion of the smart contract 130, it endorses a proposed transaction response 210 containing the required information 212 that organization is responsible for. According to various embodiments, the endorsed proposed transaction response 210 is sent to the orderer, or ordering organization 132. See circle 4. The orderer 132 is a special type of organization tasked with the responsibility of ordering and defining the ledger 124. It may comprise one or more ordering peers 134 and one or more databases 122 to store ledgers 124 for all of the PBNs 104 to which it belongs.

According to various embodiments, the orderer 132 disseminates the transaction proposal to invoke a smart contract 130 in all of the organizations indicated in the endorsement policy. The ordering peer 134 determines what, if anything, else is needed to fulfill a smart contract invocation. According to various embodiments, the orderer 132 is only concerned with the signatures, whether the proper number of signatures have been obtained, and/or whether the proper peers have signed. The actual chaincode 206 of the smart contract 130 is inconsequential to the activity of the ordering peer 134, and may be entirely opaque.

Upon determination that additional signatures are needed, the ordering peer 134 sends out signature requests to peers of the appropriate organizations. Continuing with the above example, the ordering peer 134 may see that the provider 120a has signed, but the signatures of the payer and a pharmacy 120b (which may provide the pharmaceuticals needed for a procedure) is also needed, so the transaction proposal 106 is sent to peers 108 for both organizations 116. The information from the pharmacy may be obtained by the payer to evaluate the overall cost of the procedure by requiring two signatures from the payer, the second coming back with the pharmacy response, or may wait at the payer until the proper information is available. In another embodiment, the smart contract 130 may be written such that only the payer knows who else is being queried; once the signed proposal 106 comes from the provider 120a, the payer 118 may then execute other smart contracts to obtain additional information (i.e. from the pharmacy, etc.) that the full contract requires for execution. Structuring the contracts in such a way allows for changes to be made internally without changing the way other organizations initiate the process. In some embodiments, if additional signatures are needed, the orderer 132 may execute those requests in parallel. In other embodiments, the smart contract 130 may specify that requests be made serially.

Once all of the required information 212 is available, meaning a proposed transaction response 210 has been received from each of the organizations specified in the endorsement policy 204, the chaincode 206 is executed on a second peer 104b (e.g. an endorsing peer 110) at the second organization 116b, automatically adjudicating the query 202 by operating on the required information 212 to assign a value 234 to the determination. See circle 5. The logic embodied within the smart contract 130 allows the HRCM system 100 to replace the dumb web interfaces and call centers of conventional systems with a fast, automated system that is able to provide quick responses through an immutable ledger 124 that all parties can rely on. These contracts 130 can manage intra-organization and inter-organization transactions, and can be used to manage a variety of procedures, including but not limited to determining eligibility, granting prior authorization, status monitoring, claim submission, claim adjudication, compliance, and credentialing. The only limit to what kind of decisions can be automatically made through the chaincode is what the second organization is comfortable turning over to the logic operations defined within the smart contract 130.

In some cases, the chaincode 206 may be defined such that an automatic adjudication may be made for well understood cases of that particular query, while also recognizing that other instances of the required information may be too nuanced to leave up to a machine. According to various embodiments, the value 234 provided at the end of executing the chaincode may include an actual answer (e.g. yes, no, etc.) or may indicate that the query has been escalated for evaluation by a human agent 232 through a client device 102. See circle 6. Having the option of escalation allows organizations to turn over a wider range of query types to the smart contracts, recognizing that many times there is an easy answer, without worrying about getting the edge cases wrong. Over time, as the edge cases become better understood, the smart contracts can be expanded to cover them without escalation to a human agent.

Once the orderer 132 has determined that the smart contract 130 has been fulfilled (i.e. all the organizations indicated by the endorsement policy have endorsed, and the signatures have been validated with the certificate authorities), the orderer 132 puts the transaction in sequence to be added to the ledger 124. See circle 7.1. The ordering peer places the transactions in order, determines if any are still in progress, and adds them to the historical transaction data 128 and the global state 126 (if all required signatures are present). It should be noted that all transactions, whether valid or invalid, are added to the historical transaction data 128; only valid transactions update the world state 126.

If the orderer 132 fails to get the needed signatures, it may indicate that the request has failed to the first peer 108a, which may then communicate to the client device 102 why the request failed (e.g. missing information, technical difficulty such as a timeout, etc.). A failure, as determined by the orderer 132, is purely a matter of signatures, and does not indicate the actual determination made by the execution of the smart contract 130. For example, a transaction proposal 106 that seems to be a success to the orderer 132, and added to the global state 126, may in fact indicate that the request has been denied. Put another way, the orderer 132 deals with purely administrative matters of the HRCM system 100 (e.g. its operation), while the smart contracts 130 handle the substantive matters.

Upon updating the ledger 124 stored at the orderer 132, the ordering peer 134 sends a message to the anchor peer 114 of each organization 116. See circle 7.2. This message contains the update to the ledger 124 that the peers 108 should add to their database 122. Upon receipt, the anchor peers 114 disseminate the update to the other peers 108 within their organization 116. See circle 7.3. Ledger synchronization is performed very quickly; in some embodiments, the synchronization may be performed in real-time or near real-time. The immutable nature of the ledger 124 forces all parties to honor their previous statements.

Finally, the first peer 108a may communicate the results back to the client device 102. See circle 8. This may include a unique identifier for the transaction, and the result of executing the smart contract 130 (i.e. the value 234 of the determination). If it failed to get the proper signatures, the client device 102 may indicate why, and what may be done to be successful in the future (e.g. what information to provide, etc.). Successful requests, meaning the endorsement policy was fulfilled, are added to the immutable blockchain ledger 124, whether they had positive results or not. To reiterate what was said above, just because a peer 108 has endorsed a transaction does not mean it was approved.

The execution of the HRCM system 100 in a permissioned blockchain network 104 provides opportunities that are not practical to implement in conventional systems. The immutable historical transaction data 128 can provide insights into the healthcare revenue cycle that were previously obscured by the lack of trust and uniformity that prevented anyone from seeing the big picture. For example, in some embodiments, the historical transaction data may have new applications in training machine learning models, as well as oversight of the revenue cycle itself, and all of the players within.

In some embodiments, historical transaction data 128 may be used to train a machine-learning model 226. For example, as shown in FIG. 2, a peer 108 within an organization (here, the manager organization 136) is communicatively coupled to a database 122 having the ledger 124 as well as to a data science system 138 capable of training a machine learning model 226 using the historical transaction data 128 pulled by the peer 108 from the ledger 124. See circle 9. The data science system 138 could be part of any organization 116. In some embodiments, the historical transaction data 128 may be passed through some sort of cleansing mechanism, such as a specially configured data aggregator 112, which obfuscates sensitive private data to remain in compliance with privacy laws.

In some embodiments, the machine-learning model 226 that is trained with the historical data 128 may be a propensity-to-pay model, using information including but not limited to billing transactions, payment transactions, and treatment transactions to build a model that can predict the likelihood and possibly the timeline for payment into the healthcare revenue cycle by a particular individual. Those skilled in the art will recognize that other ML models could be trained using the data stored in the ledger 124, as well.

In some embodiments, the global state 126 and historical transaction data 128 of the ledger 124 may be used for oversight purposes. For example, as shown in FIG. 2, a peer 108 within an organization (here, the manager organization 136) is communicatively coupled to a database 122 having the ledger 124 as well as to a watchdog system 140 configured to compare the global state 126 with the historical transaction data 128 to identify an unwelcome action 228. See circle 10. Unwelcome actions 228 can include, but are not limited to, insurance fraud, doctor shopping, overprescription of a pharmaceutical or class of pharmaceuticals, waste due to poorly defined smart contracts, and the like. In some embodiments, the watchdog system 140 may employ machine learning to identify the unwelcome actions 228.

Figure 3:
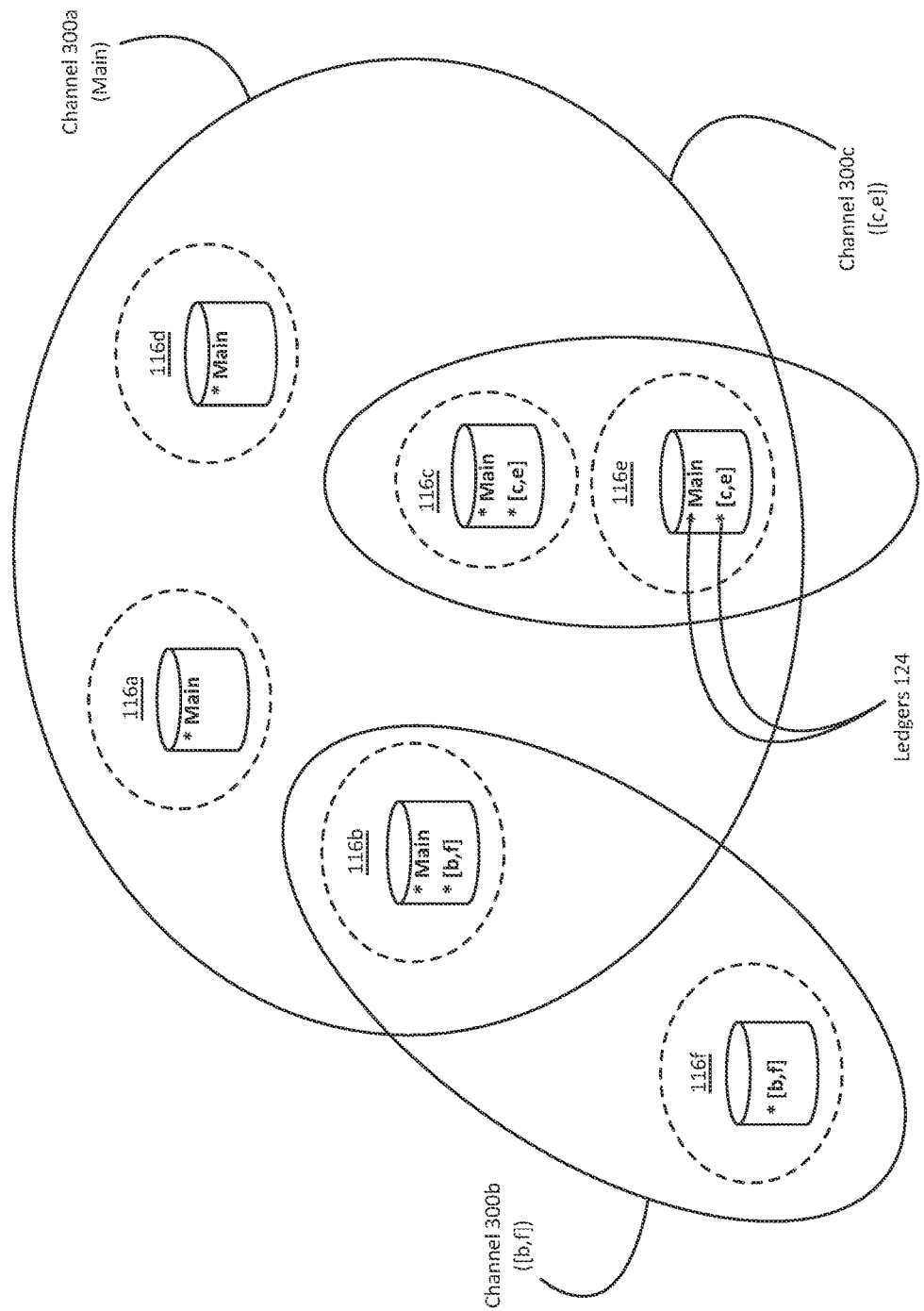
FIG. 3 is a schematic view of a healthcare revenue cycle management system comprising multiple channels.

FIG. 3 is a schematic view of a non-limiting example of a HRCM system 100 making use of multiple channels 300. Privacy and protection of patient data is of great importance within healthcare. The advantages that come from the use of an immutable ledger 124 must be balanced with the risks of exposing certain data to the wrong organizations 116. Various embodiments of the HRCM system 100 allow for the abstraction of global state 126 and historical transaction data 128 into channels 300, effectively partitioning or compartmentalizing the information.

FIG. 3 shows a non-limiting example of an HRCM system 100 made up of six organizations 116a-f interacting through three different channels 300, main (channel 300a), [b,f] (channel 300b), and [c,e] (channel 300c). Each organization 116, or more specifically the peer databases 122 of each organization 116, will maintain a global state 126 and a historical transaction data 128 for each channel 300 in which the organization 116 is participating. As shown, organization 116e, being part of the main channel 300a as well as the [c,e] channel 300c, would have two sets of ledgers 124, one for 'main' and one for '[c,e]'. Organization 116f is not part of the main channel 300a, but does participate in a channel 300b with organization 116b, so it only has a ledger 124 for channel 300b '[b,f]'. The main channel 300a, shared across many organizations, may have less sensitive information, while the smaller channels, such as channel 300c [c,e], may have private data that is critical to the operations of organizations 116c and 116e, but is both sensitive and not mission critical to the other organizations 116.

According to various embodiments, channels 300 may be established between organizations 116 that have long standing relationships, and that interact often. They may be used to communicate sensitive information. In some embodiments, some information that is particularly sensitive may be ephemeral. For example, an entry in the ledger 124 may be flagged such that it references information that will expire after a certain number of block updates, making it no longer accessible outside the originating organization 116. Ephemeral data such as this may still be trusted through the inclusion of a hash of the data alongside ledger entries for transactions based upon the data. Any later disputes may be settled by rehashing the original data, held on to the by the originating organization.

It should be noted that these "smaller" channels 300 shown in FIG. 3 are not necessarily subsets of main channel 300a. In fact, they may have a great deal more information than the main channel 300a. For example, in one embodiment, the main channel 300a could be limited to information such as transaction types, patient id numbers, and the like, while narrow channels such as channel 300c ([c,e]) could contain diagnoses, lab results, payment information, and other sensitive data shared between organization 116c (e.g. a payer) and organization 116e (e.g. a provider), but not relevant to organization 116d, (e.g. a pharmacy, a different provider, etc.).

Channels 300 may be advantageous for compartmentalization of sensitive data between relevant organizations 116, but they may require a non-negligible amount of overhead to maintain (e.g. separate ledgers 124, parallel networks 104, etc.). The overhead is a small price to pay when providing a secure conduit between organizations 116 with an ongoing and active relationship, but there may also arise situations where such a relationship does not exists, and does not warrant the creation of a channel 300 for a single or intermittent transactions.

Figure 4:
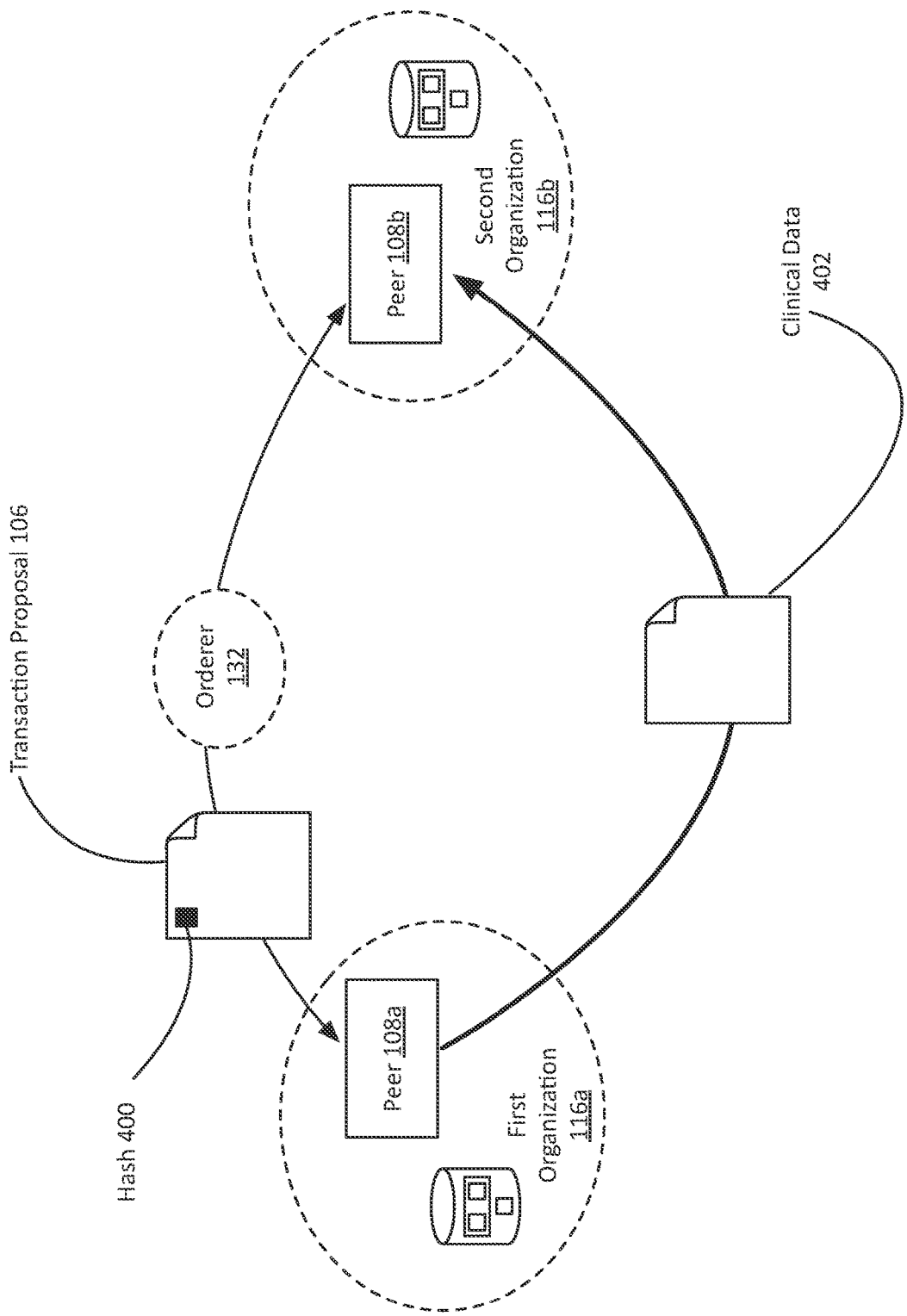
FIG. 4 is a schematic view of two organizations within the healthcare revenue cycle management system engaging in peer-to-peer communication.

According to various embodiments, the HRCM system 100 may also allow for private peer-to-peer direct communication that bypasses the blockchain network 104 altogether, while still allowing for data and transactions to be verified using the immutable shared ledger 124. FIG. 4 is a schematic view of a non-limiting example of peers 108 from two organizations 116 engaging in a peer-to-peer communication.

In this example, the first organization 116a needs to provide clinical data 402 for a patient to the second organization 116b. However, this information should not be exposed on the general blockchain ledger 124, and a channel 300 does not exist between these two organizations 116. As shown, the clinical data 402 may be directly transmitted from the first organization 116a to the second organization 116b through a temporary connection, without being added to the ledger 124. However, the transaction is not left off of the ledger 124 completely. Before transmitting, the first organization 116a performs a hash 400 of the clinical data 402, using any hashing technology or methods known in the art. The hash 400 is added to a transaction proposal 106 signed by the first organization 116a and sent to the second organization 116b through the orderer 132. The orderer 132 requests a signature from the second organization 116b indicating that their hash 400 of the data matches the hash provided by the first organization 116a. The signature of the second organization 116b fulfills the smart contract 130, and is added to the blockchain ledger 124, along with the hash 400. The sensitive data cannot be extracted from the hash 400 by the other organizations 116, but if at a later date a dispute arises as to what the clinical data 402 said, a rehashing of the data while either match the hash 400 found on the ledger 124 indicating it is the same as was originally transmitted peer-to-peer, or it will not match, indicating it has been modified since the transmission. As an option, data shared via peer-to-peer may also be ephemeral, as previously discussed.

Figure 5:
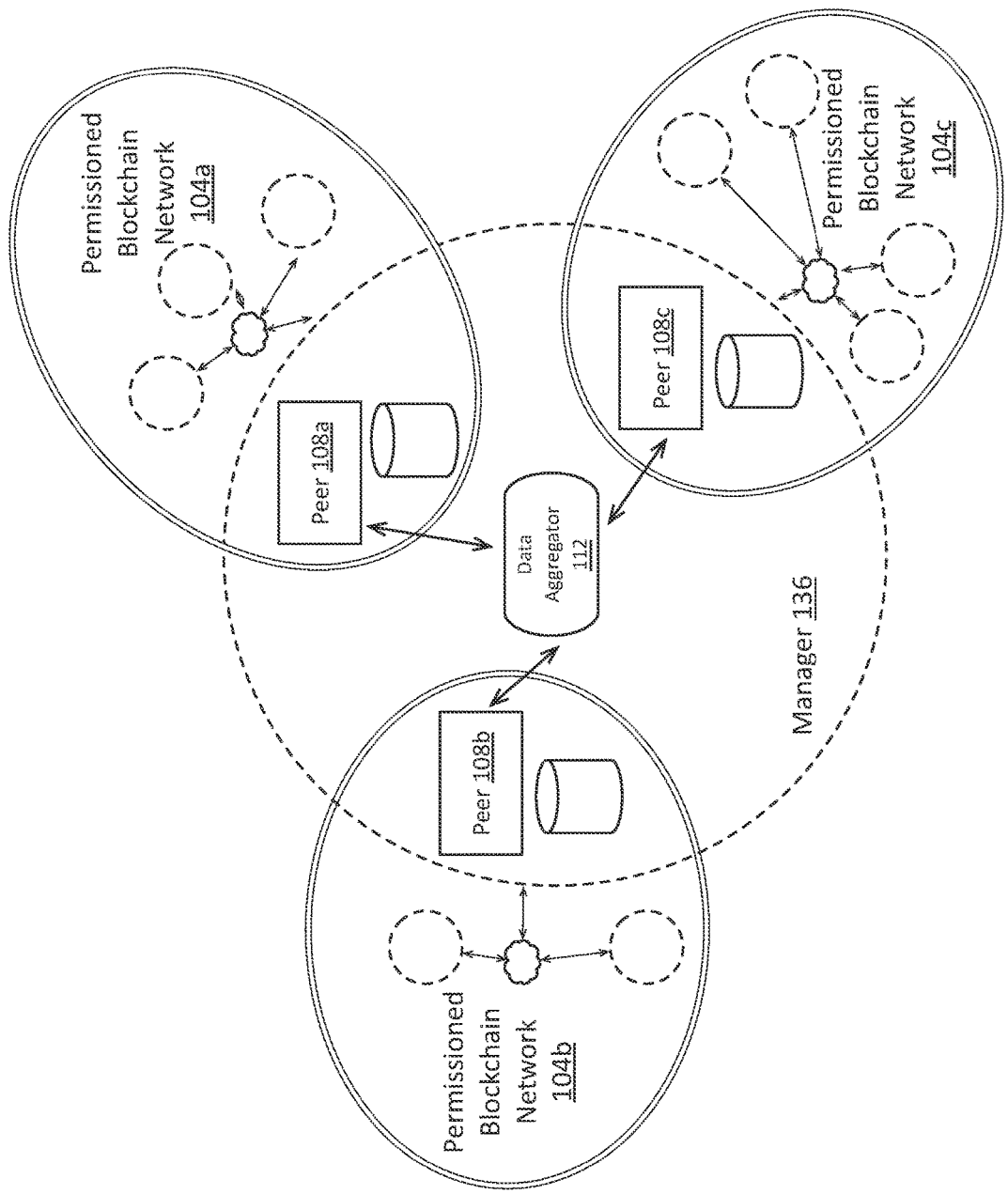
FIG. 5 is a schematic view of multiple blockchain networks being bridged by a manager organization within a healthcare revenue cycle management system.

FIG. 5 is a schematic view of a non-limiting example of multiple blockchain networks 104, each representing an implementation of a HRCM system 100, being bridged by a Manager organization 136. In some cases, information sharing will be advantageous between entire networks, rather than limited to a peer-to-peer basis. FIG. 5 shows how a manager organization 136, using a data aggregator 112 as previously discussed, may be used to bridge different blockchain networks 104a-c that may be using different common formats or other shared conventions. As shown, the manager 136 may have peers 108a-c operating simultaneously on multiple networks, or networks using different architectures or built upon different blockchain frameworks.

Figure 6:
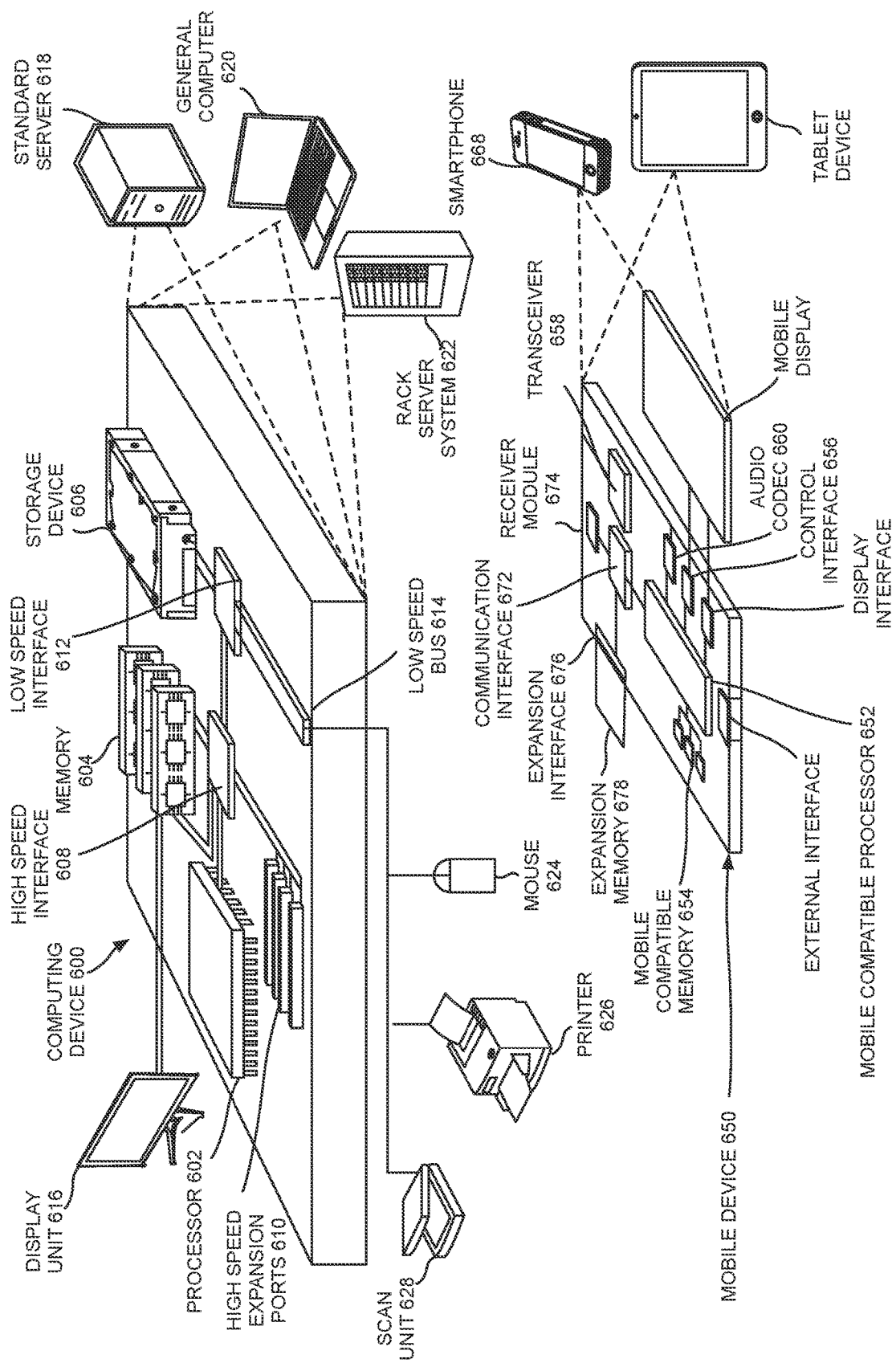
FIG. 6 is a schematic diagram of a specific computing device that can be used to implement the methods and systems disclosed herein, according to one or more embodiments.

FIG. 6 is a schematic diagram of specific computing device 600 and a specific mobile computing device 650 that can be used to perform and/or implement any of the embodiments disclosed herein. In one or more embodiments, the shared computing environment on which the system may be hosted in a virtualized or containerized implementation may be the specific computing device 600, or a collection of the specific computing device 600 operating together in a distributed manner, as is known in the art. In other embodiments, the specific computing device 600 may represent one or more of the following: client device 102, a peer 108, a data aggregator 112, a database 112, a data science system 138, a watchdog system 140, a third-party server 216, a legacy EMR/EHR system 218, and/or a human agent interface system 230. The specific mobile computing device 650 may also be a client device 102, according to various embodiments.

The specific computing device 600 may represent various forms of digital computers, such as laptops, desktops, workstations, personal digital assistants, servers, blade servers, mainframes, and/or other appropriate computers. The specific mobile computing device 630 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 600 may include a processor 603, a memory 605, a storage device 606, a high-speed interface 608 coupled to the memory 605 and a plurality of high speed expansion ports 610, and a low speed interface 612 coupled to a low speed bus 614 and a storage device 606. In one embodiment, each of the components heretofore may be inter-coupled using various buses, and may be mounted on a common motherboard and/or in other manners as appropriate. The processor 603 may process instructions for execution in the specific computing device 600, including instructions stored in the memory 605 and/or on the storage device 606 to display a graphical information for a GUI on an external input/output device, such as a display unit 616 coupled to the high speed interface 608, according to one embodiment.

In other embodiments, multiple processors and/or multiple buses may be used, as appropriate, along with multiple memories and/or types of memory. Also, a plurality of specific computing device 600 may be coupled with, with each device providing portions of the necessary operations (e.g., as a server bank, a group of blade servers, and/or a multi-processor system).

The memory 605 may be coupled to the specific computing device 600. In one embodiment, the memory 605 may be a volatile memory. In another embodiment, the memory 605 may be a non-volatile memory. The memory 605 may also be another form of computer-readable medium, such as a magnetic and/or an optical disk. The storage device 606 may be capable of providing mass storage for the specific computing device 600. In one embodiment, the storage device 606 may be includes a floppy disk device, a hard disk device, an optical disk device, a tape device, a flash memory and/or other similar solid-state memory device. In another embodiment, the storage device 606 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 605, the storage device 606, a memory coupled to the processor 603, and/or a propagated signal.

The high-speed interface 608 may manage bandwidth-intensive operations for the specific computing device 600, while the low speed interface 612 may manage lower bandwidth-intensive operations. Such allocation of functions is exemplary only. In one embodiment, the high-speed interface 608 may be coupled to the memory 605, the display unit 616 (e.g., through a graphics processor and/or an accelerator), and to the plurality of high speed expansion ports 610, which may accept various expansion cards.

In the embodiment, the low speed interface 612 may be coupled to the storage device 606 and the low speed bus 614. The low speed bus 614 may be comprised of a wired and/or wireless communication port (e.g., a Universal Serial Bus ("USB"), a Bluetooth® port, an Ethernet port, and/or a wireless Ethernet port). The low speed bus 614 may also be coupled to the scan unit 628, a printer 626, a keyboard, a mouse 624, and a networking device (e.g., a switch and/or a router) through a network adapter.

The specific computing device 600 may be implemented in a number of different forms, as shown in the figure. In one embodiment, the specific computing device 600 may be implemented as a standard server 618 and/or a group of such servers. In another embodiment, the specific computing device 600 may be implemented as part of a rack server system 622. In yet another embodiment, the specific computing device 600 may be implemented as a general computer 620 such as a laptop or desktop computer. Alternatively, a component from the specific computing device 600 may be combined with another component in a specific mobile computing device 630. In one or more embodiments, an entire system may be made up of a plurality of specific computing device 600 and/or a plurality of specific computing device 600 coupled to a plurality of specific mobile computing device 630.

In one embodiment, the specific mobile computing device 630 may include a mobile compatible processor 632, a mobile compatible memory 634, and an input/output device such as a mobile display 646, a communication interface 652, and a transceiver 638, among other components. The specific mobile computing device 630 may also be provided with a storage device, such as a microdrive or other device, to provide additional storage. In one embodiment, the components indicated heretofore are inter-coupled using various buses, and several of the components may be mounted on a common motherboard.

The mobile compatible processor 632 may execute instructions in the specific mobile computing device 630, including instructions stored in the mobile compatible memory 634. The mobile compatible processor 632 may be implemented as a chipset of chips that include separate and multiple analog and digital processors. The mobile compatible processor 632 may provide, for example, for coordination of the other components of the specific mobile computing device 630, such as control of user interfaces, applications run by the specific mobile computing device 630, and wireless communication by the specific mobile computing device 630.

The mobile compatible processor 632 may communicate with a user through the control interface 636 and the display interface 644 coupled to a mobile display 646. In one embodiment, the mobile display 646 may be a Thin-Film-Transistor Liquid Crystal Display ("TFT LCD"), an Organic Light Emitting Diode ("OLED") display, and another appropriate display technology. The display interface 644 may comprise appropriate circuitry for driving the mobile display 646 to present graphical and other information to a user. The control interface 636 may receive commands from a user and convert them for submission to the mobile compatible processor 632.

In addition, an external interface 642 may be provide in communication with the mobile compatible processor 632, so as to enable near area communication of the specific mobile computing device 630 with other devices. External interface 642 may provide, for example, for wired communication in some embodiments, or for wireless communication in other embodiments, and multiple interfaces may also be used.

The mobile compatible memory 634 may be coupled to the specific mobile computing device 630. The mobile compatible memory 634 may be implemented as a volatile memory and a non-volatile memory. The expansion memory 658 may also be coupled to the specific mobile computing device 630 through the expansion interface 656, which may comprise, for example, a Single In Line Memory Module ("SIMM") card interface. The expansion memory 658 may provide extra storage space for the specific mobile computing device 630, or may also store an application or other information for the specific mobile computing device 630.

Specifically, the expansion memory 658 may comprise instructions to carry out the processes described above. The expansion memory 658 may also comprise secure information. For example, the expansion memory 658 may be provided as a security module for the specific mobile computing device 630, and may be programmed with instructions that permit secure use of the specific mobile computing device 630. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 634, the expansion memory 658, a memory coupled to the mobile compatible processor 632, and a propagated signal that may be received, for example, over the transceiver 638 and/or the external interface 642.

The specific mobile computing device 630 may communicate wirelessly through the communication interface 652, which may be comprised of a digital signal processing circuitry. The communication interface 652 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 638 (e.g., radio-frequency transceiver). In addition, short-range communication may occur, such as using a Bluetooth®, Wi-Fi, and/or other such transceiver. In addition, a GPS ("Global Positioning System") receiver module 654 may provide additional navigation-related and location-related wireless data to the specific mobile computing device 630, which may be used as appropriate by a software application running on the specific mobile computing device 630.

The specific mobile computing device 630 may also communicate audibly using an audio codec 640, which may receive spoken information from a user and convert it to usable digital information. The audio codec 640 may likewise generate audible sound for a user, such as through a speaker (e.g., in a handset smartphone of the specific mobile computing device 630). Such a sound may comprise a sound from a voice telephone call, a recorded sound (e.g., a voice message, a music files, etc.) and may also include a sound generated by an application operating on the specific mobile computing device 630.

The specific mobile computing device 630 may be implemented in a number of different forms, as shown in the figure. In one embodiment, the specific mobile computing device 630 may be implemented as a smartphone 648. In another embodiment, the specific mobile computing device 630 may be implemented as a personal digital assistant ("PDA"). In yet another embodiment, the specific mobile computing device, 630 may be implemented as a tablet device 650.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other networks, protocols, and hardware and examples could be intermixed or substituted with those provided. In places where the description above refers to particular embodiments of systems and methods for healthcare revenue cycle management, it should be readily apparent that a number of modifications may be made without departing from the spirit thereof and that these embodiments and implementations may be applied to other to revenue cycles and industries as well. Accordingly, the disclosed subject matter is intended to embrace all such alterations, modifications and variations that fall within the spirit and scope of the disclosure and the knowledge of one of ordinary skill in the art.

What is claimed is:

1. A method for healthcare revenue cycle management, comprising:
   receiving, from a client device, a transaction proposal at a first peer of a plurality of peers certified by a first organization within a permissioned blockchain network (PBN) comprising a plurality of organizations sharing an immutable ledger, wherein the transaction proposal comprises a patient identity and a query, the query being a determination of one of an out-of-pocket expense and an insurance prior authorization, said determination to be made by a second organization, wherein the first organization represents a healthcare provider within the PBN, wherein the second organization represents a healthcare payer within the PBN;
   identifying, by the first peer, a smart contract associated with the query, the smart contract having an endorsement policy and a chaincode defined by the second organization to automatically adjudicate the query, wherein the endorsement policy indicates the second organization and at least one organization responsible for information required by the second organization to execute the chaincode;
   endorsing the transaction proposal using a private cryptographic key provided by the first organization;
   invoking the smart contract in at least one endorsing peer using the endorsed transaction proposal, wherein each of the at least one endorsing peer is certified by a different organization of the at least one organization responsible for required information as indicated by the endorsement policy;
   receiving, from each of the at least one endorsing peer, an endorsed proposed transaction response as a result of the smart contract invocation, wherein the required information provided in the at least one endorsed proposed transaction response comes from at least one of reading a global state of the immutable ledger and updating the global state, and wherein the source of the required information in the at least one endorsed proposed transaction response is determined by a comparison of an age of the information within the immutable ledger and an update policy defined by the second organization within the smart contract;
   automatically adjudicating the query by executing the chaincode on a second peer, operating on the required information to assign a value to the determination, wherein the second peer is certified by the second organization, and wherein the execution of the chaincode at the second peer is done in response to receipt of the endorsed proposed transaction response from each of the at least one endorsing peer;
   updating the immutable ledger with the determination after validating the satisfaction of the endorsement policy; and
   sending to the client device the determination,
   wherein invoking the smart contract on the at least one endorsing peer results in a first endorsing peer requesting a data object from a legacy EMR/EHR system through a data aggregator, and transforming the data object provided by the legacy EMR/EHR system into a format compatible with the PBN, and
   wherein at least the first peer, the second peer, and the at least one endorsing peer are all hosted within a shared hardware environment.

2. The method of claim 1, further comprising:
   retrieving historical transaction data from the immutable ledger of the PBN, said historical transaction data comprising billing transactions, payment transactions, and treatment transactions; and
   training a propensity-to-pay machine learning model using the historical transaction data.

3. The method of claim 1, wherein the determination produced by the execution of the chaincode indicates one of affirmative, negative, and that the query has been escalated for evaluation by a human agent of the healthcare payer.

4. The method of claim 1, further comprising identifying an unwelcome action within the immutable ledger by comparing a global state of the immutable ledger with historical transaction data from the immutable ledger, wherein the unwelcome action comprises one of insurance fraud, doctor shopping, and over-prescription of a pharmaceutical.

5. The method of claim 1, wherein invoking the smart contract on the at least one endorsing peer comprises a first endorsing peer executing a second smart contract installed on the first endorsing peer to generate a proposed transaction response to the invocation of the smart contract.

6. A method for healthcare revenue cycle management, comprising:
   receiving, from a client device, a transaction proposal at a first peer of a plurality of peers certified by a first organization within a permissioned blockchain network (PBN) comprising a plurality of organizations sharing an immutable ledger, wherein the transaction proposal comprises a patient identity and a query, the query being a determination of one of an out-of-pocket expense and an insurance prior authorization to be made by a second organization of the plurality of organizations, wherein each organization of the plurality of organizations represents, within the PBN, one of a healthcare payer and a healthcare provider;
   identifying, by the first peer, a smart contract associated with the query, the smart contract having an endorsement policy and a chaincode defined by the second organization to automatically adjudicate the query, wherein the endorsement policy indicates the second organization and at least one organization responsible for information required by the second organization to execute the chaincode;
   invoking the smart contract in at least one endorsing peer using the transaction proposal, wherein each of the at least one endorsing peer is certified by a different organization of the at least one organization responsible for required information as indicated by the endorsement policy;
   receiving, from each of the at least one endorsing peer, a proposed transaction response as a result of the smart contract invocation;
   automatically adjudicating the query by executing the chaincode on a second peer, operating on the required information to assign a value to the determination, wherein the second peer is certified by the second organization, and wherein the execution of the chaincode at the second peer is done in response to receipt of the proposed transaction response from each of the at least one endorsing peer;
   updating the immutable ledger with the determination after validating the satisfaction of the endorsement policy; and
   sending to the client device the determination.

7. The method of claim 6, wherein invoking the smart contract on the at least one endorsing peer results in a first endorsing peer retrieving a data object from a third-party server that is outside of the PBN using a data aggregator to transform the data object into a format compatible with the PBN, wherein the data aggregator is communicatively coupled to the first endorsing peer and the third-party server, and the third-party server is not represented by any of the plurality of organizations.

8. The method of claim 6, wherein invoking the smart contract on the at least one endorsing peer results in a first endorsing peer requesting a data object from a legacy EMR/EHR system through a data aggregator, and transforming the data object provided by the legacy EMR/EHR system into a format compatible with the PBN.

9. The method of claim 6, wherein the determination produced by the execution of the chaincode indicates one of affirmative, negative, and that the query has been escalated for evaluation by a human agent.

10. The method of claim 6, wherein the at least one endorsing peer is certified by the first organization.

11. The method of claim 6, wherein at least the first peer, the second peer, and the at least one endorsing peer are all hosted within a shared hardware environment.

12. The method of claim 11, wherein at least the first peer, the second peer, and the at least one endorsing peer are each implemented as containers within the shared hardware environment.

13. The method of claim 6, further comprising retrieving historical transaction data from the immutable ledger of the PBN, and training a machine learning model using the historical transaction data.

14. The method of claim 13, wherein the historical transaction data comprises billing transactions, payment transactions, and treatment transactions, and wherein the machine learning model is a propensity-to-pay model.

15. The method of claim 6, further comprising identifying an unwelcome action within the immutable ledger by comparing a global state of the immutable ledger with historical transaction data from the immutable ledger, wherein the unwelcome action comprises one of insurance fraud, doctor shopping, and over-prescription of a pharmaceutical.

16. The method of claim 6, wherein the smart contract is a first smart contract, and invoking the first smart contract on the at least one endorsing peer comprises a first endorsing peer executing a second smart contract installed on the first endorsing peer to generate the proposed transaction response to the invocation of the first smart contract.

17. The method of claim 6, wherein the required information provided in the at least one endorsed proposed transaction response comes from at least one of reading a global state of the immutable ledger and updating the global state.

18. The method of claim 17, wherein the source of the required information in the at least one endorsed proposed transaction response is determined by a comparison of an age of the information within the immutable ledger and an update policy defined by the second organization within the smart contract.

* * * * *